(12) United States Patent
Billerbeck et al.

(10) Patent No.: US 9,294,754 B2
(45) Date of Patent: Mar. 22, 2016

(54) HIGH DYNAMIC RANGE AND DEPTH OF FIELD DEPTH CAMERA

(71) Applicant: Lumentum Operations LLC, Milpitas, CA (US)

(72) Inventors: Bryed Billerbeck, Cupertino, CA (US); An-Chun Tien, San Jose, CA (US); Lucas Morales, San Francisco, CA (US)

(73) Assignee: Lumentum Operations LLC, Milpitas, CA (US)

( * ) Notice: Subject to any disclaimer, the term of this patent is extended or adjusted under 35 U.S.C. 154(b) by 448 days.

(21) Appl. No.: 13/757,301

(22) Filed: Feb. 1, 2013

(65) Prior Publication Data

US 2013/0201288 A1    Aug. 8, 2013

Related U.S. Application Data

(60) Provisional application No. 61/594,745, filed on Feb. 3, 2012.

(51) Int. Cl.
| | |
|---|---|
| *H04N 13/02* | (2006.01) |
| *G01S 17/89* | (2006.01) |
| *G01S 7/481* | (2006.01) |
| *G01S 7/484* | (2006.01) |
| *G01S 7/486* | (2006.01) |

(52) U.S. Cl.
CPC ............ *H04N 13/0203* (2013.01); *G01S 7/484* (2013.01); *G01S 7/4814* (2013.01); *G01S 7/4868* (2013.01); *G01S 17/89* (2013.01)

(58) Field of Classification Search
CPC .......... G01C 3/08; G01S 7/497; G01S 7/4802
USPC ................................. 356/3.01–5.15, 4.01–4.1
See application file for complete search history.

(56) References Cited

U.S. PATENT DOCUMENTS

2002/0015144 A1 * 2/2002 Seo ............................. 356/5.01
2009/0273770 A1 * 11/2009 Bauhahn et al. ............. 356/5.01

* cited by examiner

*Primary Examiner* — Luke Ratcliffe
(74) *Attorney, Agent, or Firm* — Harrity & Harrity, LLP

(57) ABSTRACT

In order to maximize the dynamic range and depth of field for a depth camera used in a time of flight system, the light source is modulated at a plurality of different frequencies, a plurality of different peak optical powers, a plurality of integration subperiods, a plurality of lens foci, aperture and zoom settings during each camera frame time. The different sets of settings effectively create subrange volumes of interest within a larger aggregate volume of interest, each having their own frequency, peak optical power, lens aperture, lens zoom and lens focus products consistent with the distance, object reflectivity, object motion, field of view, etc. requirements of various ranging applications.

24 Claims, 4 Drawing Sheets

HIGH DYNAMIC RANGE AND DEPTH OF FIELD DEPTH CAMERA

CROSS-REFERENCE TO RELATED APPLICATIONS

The present invention claims priority from U.S. Patent Application Ser. No. 61/594,745 filed Feb. 3, 2012, which is incorporated herein by reference.

TECHNICAL FIELD

The present invention relates to a high dynamic range and depth of field depth camera, and in particular to a depth camera, which has a plurality of frequency, peak optical power and integration period settings within each frame time for use in a time of flight based camera system.

BACKGROUND OF THE INVENTION

In traditional photography, depth of field (DOF) is how much of your image is in focus. Shallow depth of field refers to when only things that are very close to the plane of the subject you focus on are in focus. Objects that are behind or in front of your subject will appear out of focus. Dynamic range refers to the difference between your highlights and shadows in an image. On average, the human eye can see dynamic range on the order of 1,000,000:1. What this means is that we can see details in both very bright and very dark areas of a scene at the same time. A digital sensor has a dynamic range on the order of 1,000:1, which means that if your subject is very bright compared to your background, when you expose the image correctly for your subject, you background will appear to be very dark. Conversely, if you exposed the image for the background, your subject may appear "blown out" or very bright white and overexposed.

As with traditional photography cameras, depth of field, i.e. image sharpness consistency within the camera Field of View (FOV) and range of interest, and image dynamic range, i.e. image contrast range within the camera FOV and range of interest, requirements can be a significant challenge to a depth camera. In the case of a depth camera, objects close to the camera's light source and or of high reflectivity can cause over saturation of sensor pixels while objects further from the camera's light source and or of low reflectivity can be difficult for the sensor/camera to detect at all.

A "Time-of-Flight" based depth camera comprises a depth image sensor, which is typically made using a standard CMOS fabrication process, and an IR light source for measuring distance, which is proportional to the length of time the IR light takes to travel from and return to the camera. A depth camera system generates depth images and transmits them to the host processor over a suitable, e.g. USB, interface.

The camera hardware includes a light source module, an IR light detecting, e.g. CMOS, image sensor, and an ambient light-color sensing, e.g. CMOS, image sensor. A 3D imager produces phase measurements that are processed either on sensor or in a remote coprocessor to produce actual range data. Such a camera can be used in "Z-only" mode for applications, which require the use of range data only. The camera could also be used in "RGB+Z", i.e. full 3D depth and 2 dimensional colors, modes for applications which utilize both traditional color as well as depth images. Depth and color processing can be done in the camera or with a pass-through mode in which unprocessed data can be passed to the host for processing.

In a depth only camera, the sensor and light source will be synchronized in time. In RGB and depth cameras, the light source and the two sensors will be synchronized in time, such that both sensors start their frames cycles with a known and locked timing relationship, e.g. at the same time, with each other and the light source. Also, the frame start time of each sensor can be adjusted with respect to the data stream to the host to provide a system-level synchronization capability. Data from each sensor and audio can be transmitted to host devices on separate streams over various interfaces, such as a USB2.0 isochronous link, which may include a tagging capability to insert timestamps into each frame of each sensor. Similarly, the data streams could be integrated before transmission and de-integrated by the host.

The camera enables developers to create many new kinds of applications, e.g. gesture control of host devices, interactive games, etc., requiring both depth and color video.

In a typical Time of Flight (ToF) based camera, the camera is designed to synchronously modulate a light source at a fixed Peak Optical Power (POP) level with a sensor's active integration period, i.e. frame time. In some implementations, camera operating frequencies are varied in fairly narrow ranges, e.g. +/−20 MHz, to be able to detect distance aliasing artifacts caused by frequency wrap around or reflections of objects beyond the camera's working range created by frequency range multiples. In ToF based cameras, frequency is proportional to distance, e.g. an object at 6 m, which is 1 m outside a 5 m range of interest, can be falsely detected as an object of low reflectivity at 3 m, a distance within the range of interest.

An object of the present invention is to overcome the shortcomings of the prior art by providing a depth camera for a ToF system that divides the overall range of interest and Field of View (FoV) into Volume of Interest (VOI) sub-ranges with different frequency, peak optical power and integration period pairs or triplets for each VOI sub-range.

SUMMARY OF THE INVENTION

Accordingly, the present invention relates to a depth camera for a time of flight device for presenting three dimensional data to a host comprising:

a light source for launching a beam of light at a range of interest for a field of view, the light source having an adjustable frequency and an adjustable peak optical power;

a detector array for receiving and detecting portions of the beam of light reflected off of objects within the range of interest and field of view; and a controller for adjusting the light source frequency and peak optical power within a single frame time period in accordance with a plurality of frequency and peak optical power pairs to obtain a plurality of three dimensional data measurements for each frame, whereby the range of interest and field of view is divided into a plurality of volumes of interest, each volume of interest having a different, frequency, peak optical power, and minimum and maximum distance from the light source, to increase dynamic range and depth of field within each volume of interest.

Another aspect of the present invention relates to a method of operating a depth camera comprising:

a) launching light from a light source at a range of interest over a field of view; and b) receiving and detecting portions of the beam of light reflected off of various objects within the range of interest and the field of view;

wherein step a) includes:

launching a first beam of light at a first frequency and a first peak optical power for a first integration period within a single frame time period to increase depth of field and dynamic range within a first volume of interest to generate a first three dimensional data measurement;

launching a second beam of light at a second frequency greater than the first frequency and a second peak optical power less than the first peak optical power for a second integration period within the same single frame time period to increase depth of field and dynamic range within a second volume of interest to generate a second three dimensional data measurement; and launching a third beam of light at a third frequency greater than the second frequency and a third peak optical power less than the second peak optical power for a third integration period within the same single frame time period to increase depth of field and dynamic range within a third volume of interest to generate a third three dimensional data measurement.

Yet another aspect of the present invention includes a time of flight based depth camera for presenting three dimensional data to a host device comprising:

a light source for launching a beam of light at a range of interest for a field of view, the light source having variable integration time periods and peak optical power;

a detector array for receiving and detecting portions of the beam of light reflected off of objects within the range of interest and field of view; and a controller for adjusting the light source integration time period and peak optical power within a single frame time period in accordance with a plurality of integration time period and peak optical power pairs to obtain a plurality of three dimensional data measurements, whereby the range of interest and field of view is divided into a plurality of volumes of interest, each volume of interest having a different, integration time period, peak optical power, and minimum and maximum distance from the light source, to increase dynamic range and depth of field within each volume of interest.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
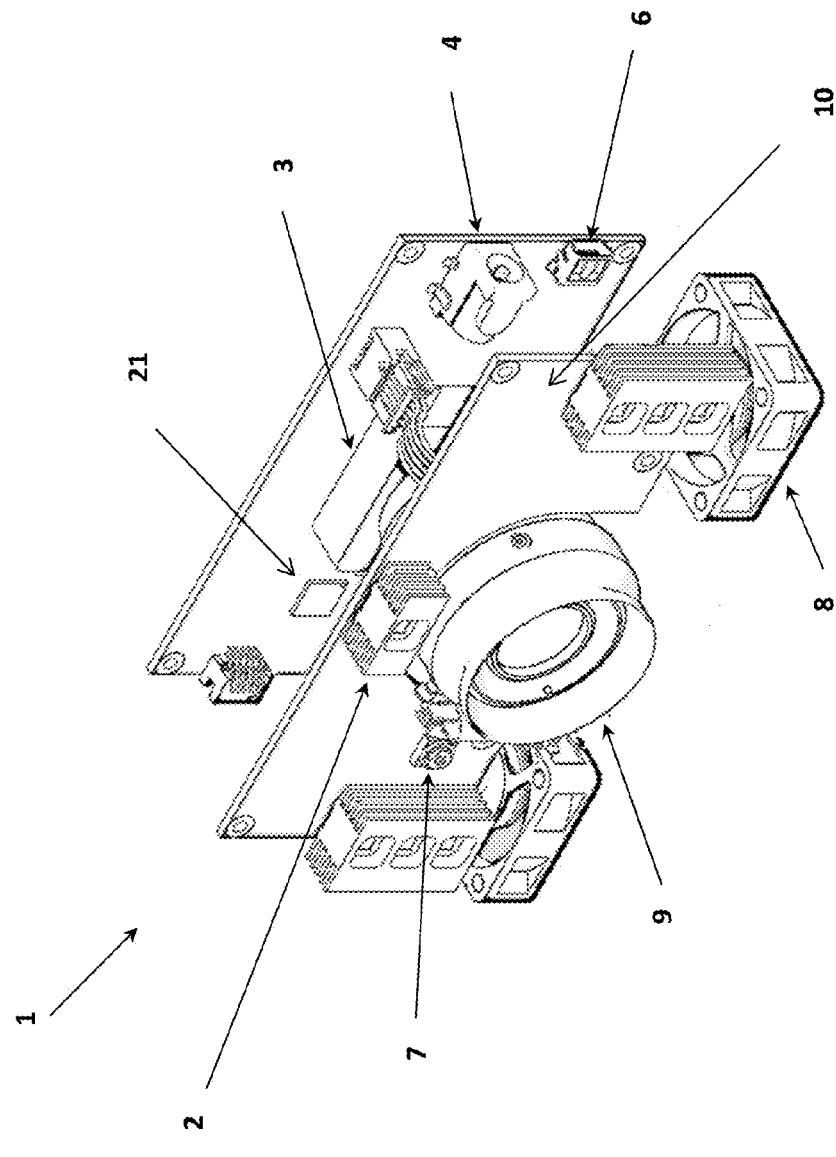
FIG. 1 is an isometric view of a depth camera in accordance with the present invention.

With reference to FIG. 1, a depth camera 1, in accordance with the present invention, for a Time of Flight (ToF) system, e.g. for a gesture recognition device, includes a light source 2, e.g. an LED, Laser or other light emitting device with associated drive and control circuitry, for launching a beam of light into an overall Range of Interest (RoI) and Field of View (FoV), a receiving optic with an IR filter, and a depth sensor detector array 3 for receiving and detecting portions of the beam of light reflected off of various moving objects within the RoI and FoV. The depth camera 1 also includes a power port 4 for connection to a remote or host power supply, and a data port 6 for connection to a host processor. In the illustrated application, a color (RGB) camera 7 is also provided, along with variable speed fans 8 for cooling the system.

When considering dynamic range and depth of field, higher frequencies and lower powers work well for short range applications (0.5 mm to 3 m), low frequencies and high powers work well for long range applications (3 m to 5 m), and something in between is better for intermediate range applications (2 m to 4 m). However, the camera 1, of the present invention, provides a working range of between 0.5 mm and 5 m or more.

Figure 2:
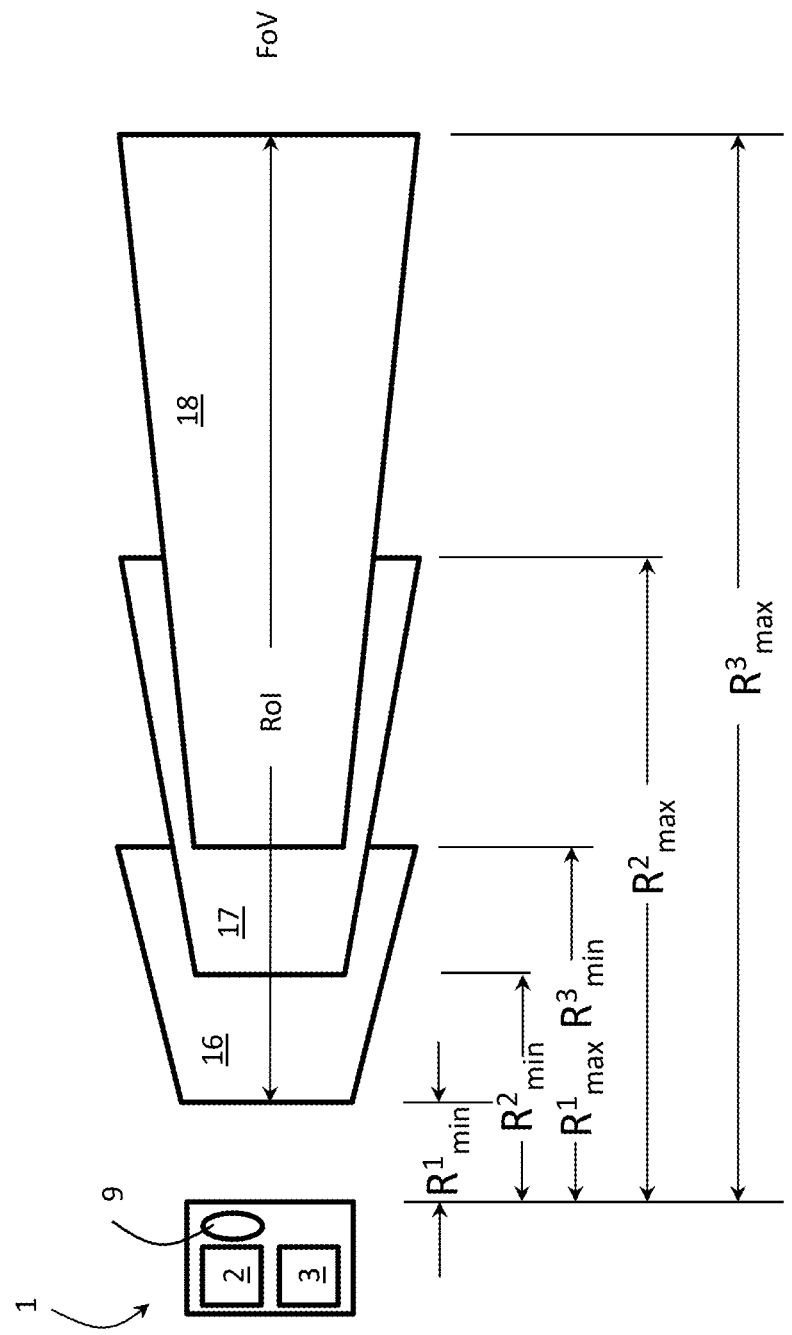
FIG. 2 is a schematic representation of the depth camera of FIG. 1 with predefined volume of interest sub-ranges in accordance with the present invention.

With reference to FIG. 2, the RoI and FoV, for the camera 1 according to the present invention, is divided into a plurality of sub-range volumes of interest (VoI), 16, 17 and 18, each with their own operating frequency and synchronized with a different light source peak optical power (POP) during a integration subperiod within the camera's frame time to create frequency, POP and integration subperiod pairs or triplets more finely tuned for the plurality of sub-ranges within the camera application's range of interest. The summing or aggregation of these sub-range intra-frame time frequency, POP and integration subperiod pairs or triplets creates a higher dynamic range and sharper depth of field image within the given overall RoI. Three VoI's are illustrated; however, two, four or more VoI's are possible and within the scope of this invention.

An aggregation process is used to stitch together intra frame depth image fragments generated by the depth camera 1 using optical power, frequency and integration period pairs or triplets into a single or multiple frame composite image(s). Such aggregation could be done by, but not limited to, the simple or weighted averaging of individual pixel values generated by intra frame or multiple frame pairs, triplets, quadruplets, etc. Similarly mean values, mode values, etc. could be used.

The determination of appropriate frequency, power values and ideally integration subperiods can be made via estimation, calculation or empirically for static or dynamic scenes, statically, e.g. during an initial set up, or dynamically, e.g. during use. An example of a simple static estimation would be to break the FOV Volume Of Interest (VOI) into a plurality of sections, e.g. two to five or more VoI sub-ranges, in the depth direction and assume that the power required for successive sections would increase moving away from the camera. The appropriate number of VoI sub-ranges is dependent on the application's overall range and depth of field requirements, and typical object reflectivity's in the range, i.e. longer distances and greater target object reflectivity ranges could mean more sections. The VoI sub-ranges can have equal ranges, and volumes, e.g. 1.5 m to 3 m, preferably 2 m deep, or they can have different ranges and volumes, e.g. the first volume 16 is smaller than the second volume 17, which is smaller than the third volume 18. Typically these sub-ranges or volumes will grow with distance from the camera 1.

The VoI sub-ranges can be discreet volumes, e.g. VoI 16 has an $R^1_{min}$ to $R^1_{max}$ of from 0.5 m to 1.5 m, VoI 17 has a $R^2_{min}$ to $R^2_{max}$ of from 1.5 m to 3 m, and VoI 18 has a $R^3_{min}$ to $R^3_{max}$ of from and 3 m to 5 m. Alternatively, the VoI sub-ranges can be a series of overlapping volumes, e.g. VoI 16 has an $R^1_{min}$ to $R^1_{max}$ of from 0.5 m to 2 m, VoI 17 has a $R^2_{min}$ to $R^2_{max}$ of from 1 m to 3 m, and VoI 18 has a $R^3_{min}$ to $R^3_{max}$ of from and 2 m to 5 m.

Figure 3:
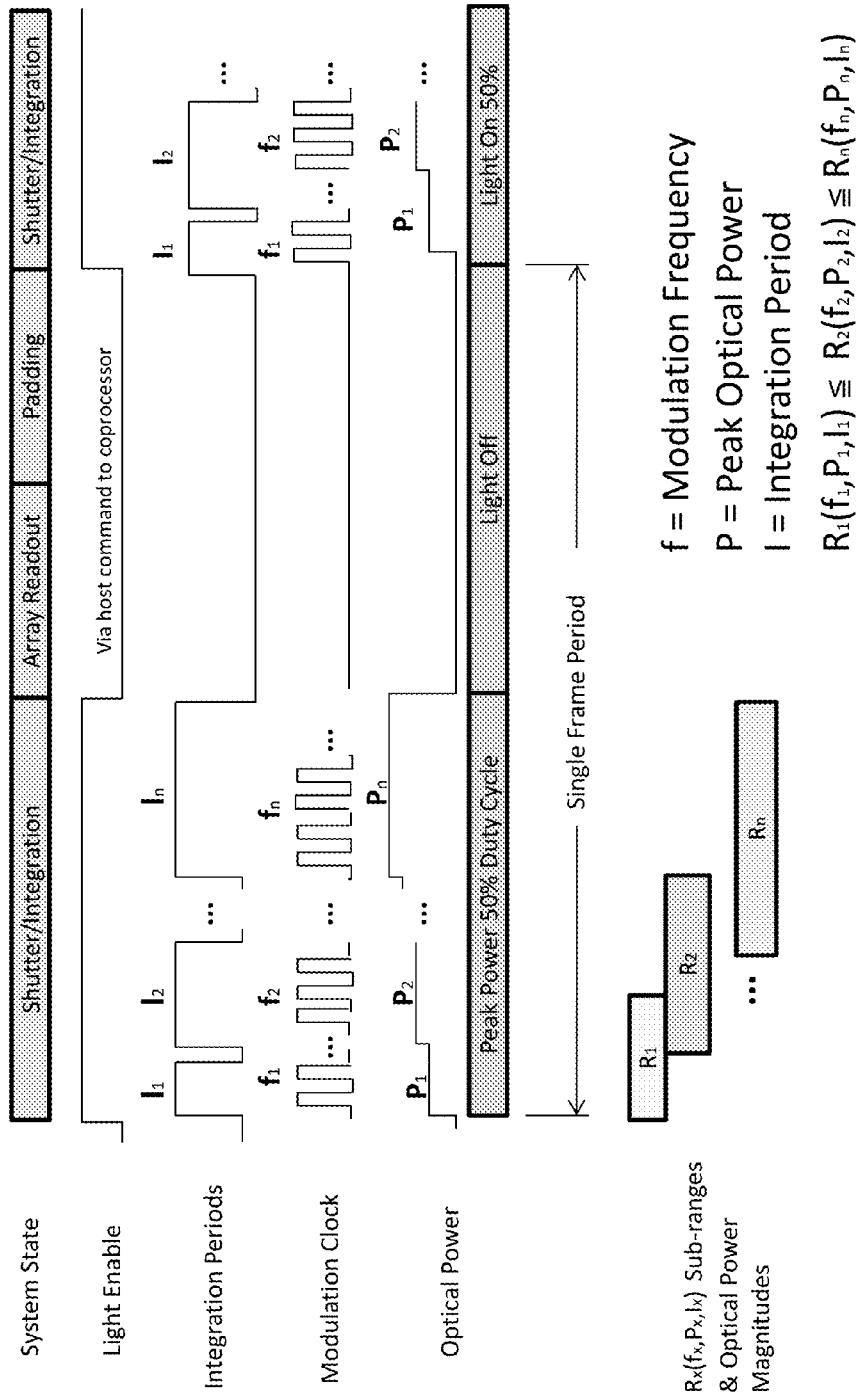
FIG. 3 is a plot of volume of interest sub-range triplet information in accordance with the present invention.

Next, with reference to FIG. 3, a frequency $f_n$ is selected, e.g. a suitable unambiguous, frequency or the highest (non-aliasing) prime frequency the camera 1 is capable of, within a selected low range of frequencies (10 to 40 MHz) for the farthest VoI sub-range, e.g. VoI 18.

For example: at 5 m $R^3$max, the non-aliasing max frequency is 20 MHz, but 19 MHz, which is the highest prime frequency close to but not higher than 20 MHz, may be the better choice for the farthest VoI subrange 18, so that erroneous readings do not occur due to the closer subranges in which the frequency might be set to 40 MHz or 60 MHz, thereby creating interfering harmonics. Accordingly, 37 MHz or 59 MHz would likely be better choices for the middle subrange VoI 17, and 97 MHz, etc. for the nearest subrange VoI 16. Ideally, the least common multiple of the three frequencies $f_1$, $f_2$, $f_n$, selected are outside the working range of the camera.

The POP $P_n$ for the farthest VoI sub-range, e.g. VoI 18, is then determined based on the frequency $f_n$ and the POP necessary to resolve the required minimum object size at its lowest targeted reflectivity. As the range VoI moves closer to the camera, the frequency and POP values are modified to optimize performance within the closer VoI sub-ranges, e.g. VoI sub-ranges 16 and 17, e.g. lower power, higher frequency in successive ranges getting closer to camera. The frequency values between the VoI's 16 to 18 are at much wider ranges, e.g. greater than +/−30 MHz, 50 MHz and up at least 100 MHz, than prior art systems.

For example: for the farthest VoI sub-range 18 the frequency $f_n$ selected might be 10 to 40 MHz, preferably 20 to 25 MHz to avoid distance aliasing in the range, and the POP $P_n$ might be determined to be 5 W or more, preferably 1 W or more, most preferably greater than 500 mW, but ideally as low as possible to reduce power requirements. The middle VoI sub-range 17 can have a frequency $f_2$ higher than the farthest VoI sub-range 18, e.g. 30 to 70 MHz, preferably 40 to 50 MHz to avoid distance aliasing within this midrange, with a POP $P_2$ less than the farthest VoI sub-range 18, e.g. less than half of the farthest sub-range or 250 mW to 4 W, preferably 250 mW to 1 W, and most preferably 250 mW to 500 mW, but ideally as low as possible. The closest VoI sub-range 16 can have a frequency $f_1$ higher than the other two or more VoI sub-ranges, e.g. 60 MHz or more, preferably 75 MHz or more, but typically as high as possible below the distance aliasing frequency, with a POP $P_1$ less than the other ranges, e.g. 400 mW or less, preferably less than 250 mW, and most preferably 50 mW or less, but ideally as low as possible.

In a simple embodiment, the intra-frame integration period I is divided equally amongst the VoI sub-ranges; however, the intra-frame integration periods $I_1$, $I_2$, ... $I_n$ can be divided unevenly amongst the frequency/POP pairs to more optimally allocate power within or distribute power to the various VoI sub-ranges. Intra-frame integration time, frequency and or power might be reduced to avoid saturation of more reflective objects with in the range's VOI. For example: an integration period between say 5% and 40%, preferably between 25% and 40%, of the total frame period would be suitable time periods, depending on system requirement. Typically, the larger VoI sub-ranges and those with longer ranges require more time, e.g. a larger percentage of the integration period.

If it is determined that the frequency, POP and integration subperiod pairs or triplets require less than a full frame period to achieve desired image quality, the light source can be turned off to conserve power and reduce the generation of unwanted heat in the system, as illustrated in FIG. 3.

The aggregation of object depth values across these more optimized sub-range intra-frame time frequency, POP and integration time triplets $R_1$, $R_2$, ... $R_n$ enables the creation of a higher dynamic range, sharper depth of field and more accurate depth image of a given range of interest. As the VoI sub-ranges move closer to the camera 1, the pair or triplet values can be modified to optimize performance within the second sub-range's VoI, e.g. lower power, higher frequency in successive ranges getting closer to camera.

In a more complex case, e.g. a dynamic scene where objects of varying brightness are moving within the scene and various VoI sub-ranges, historical frame data can be used to make predictive modifications dynamically during camera operation. The object motion is tracked in three dimensions as well as its brightness. As an example, if in a few frames of data a bright or highly reflective object is found within a VoI sub-range's moving closer to the camera 1, the triplet R of that sub-range VoI or zone could be modified, as necessary. For example: the light source power P could be reduced and/or the frequency f could be increased and/or the integration period I could be reduced, or any similar weighted combinations of these variables could be changed, using the components and processes described in the below explanation of the 3D camera block diagram, to avoid a saturation issue. Similarly, a darker or less reflective object moving away from the camera 1 could trigger modification to a range's VoI triplet to keep the object from disappearing while still in the range.

In yet another embodiment, the intra-frame triplet variations could be used in conjunction with an autofocus/zoom lens 9, with or without an equivalent light source zoom capability. In the case of the autofocus/zoom lens 9, a sub-range VoI triplet could become a quadruplet. In addition to modifying one or more of intra-frame frequency, integration time, and optical power, the FOV/VOI could be increased or decreased as an application required by the widening or narrowing the FOV/VOI of one of the sub-range VoI's 16 to 18. As an example, the sub-range VoI's closer to the camera 1 typically require larger FOVs than sub-range VoI's further from the camera 1. Narrowing or widening the camera's FOV has nearly the same effect as increasing or decreasing POP for a sub-range VoI, the amount of which depends on whether or not the light source is synchronously zoomed with the lens 9 to cover the same FOV. As objects get closer to the camera 1, they get larger, taller and wider and would benefit from a larger FOV. So, rather than simply reducing the POP, frequency or integration period to avoid saturation, the lens and the light source can be zoomed out, which would effectively reduce the per pixel POP and similarly avoid potential object saturation issues. Alternatively, as objects move further from the camera 1, they get smaller, shorter and narrower which leaves room to reduce the cameras FOV. So, rather than simply increasing the POP, frequency or integration period to avoid object disappearance, the lens 9 and light source 2 can be zoomed in to effectively increase per pixel POP. This could significantly reduce the maximum POP and electrical power requirement of the camera 1 throughout its total range.

In yet another embodiment, the intra-frame triplet, or intra-frame triplet plus zoom lens 9 intra-frame quadruplet variations. could be used in conjunction with lens 9 with variable aperture capability, with or without an equivalent lens or light source zoom capability. In the case of the variable aperture lens 9, a sub-range VoI triplet could become a quadruplet or quintuplet if used with the lens' zoom capability. In addition to modifying one or more of intra-frame frequency, integration subperiod, and optical power, the FOV/VOI could be increased or decreased as an application required by the widening or narrowing the lens aperture setting of one of the sub-range VoI's 16 to 18. As an example, a camera sub-range VoI may require more or less light than the previous or next camera sub-range VoI. Narrowing or widening the camera's aperture has nearly the same effect as increasing or decreasing POP for a sub-range VoI, the amount of which depends on whether or not the light source 2 is synchronously zoomed and or focused with the lens 9 to cover the same FOV.

The light source 2 comprises a laser required to actively illuminate the specified optical field of view within the camera working range with modulated light. The light source 2 provides the specified wavelength of monochromatic light for the active illumination. A typical light source 2 comprises a laser, high speed driver circuitry 10 and a diffuser for uniform light distribution within the FOV. The laser driver circuit 10 is controlled with signals coming from a coprocessor 21. The light source 2 is modulated during the integration time of the sensor 3 and is tightly coupled with sensor operation. Care needs to be taken to control the timing and waveform of signals going to the light source 2 and within the light source 2 to produce proper illumination over the operating temperature.

Light source frequency is a critical system performance variable and must be selected carefully based on camera operating range with higher frequencies being better for near range applications and lower frequencies being better for long range applications. Along with multi-frequency implementation, aliasing artifacts can be reduced by proper frequency selection for an application.

Depending on sensor architecture and output, the coprocessor 21 is provided that can translate phase data to depth data, performs depth calibration, depth data corrections, RGB color processing, compression sensor control, RGB & Z data synchronization, tagging and registration. For low functioning sensors (RGB or Z), some or all of these above processes could be handled by the camera coprocessor 21 or raw data could be passed through to the host for processing. For higher functioning sensors, fewer of these processes will need to be handled by the coprocessor 21 within the camera 1. The choice of coprocessor 21 is very much dependent on the target host processing capability. Less intelligent host devices require more in camera processing while more intelligent host devices can be less dependent on in camera processing.

Figure 4:
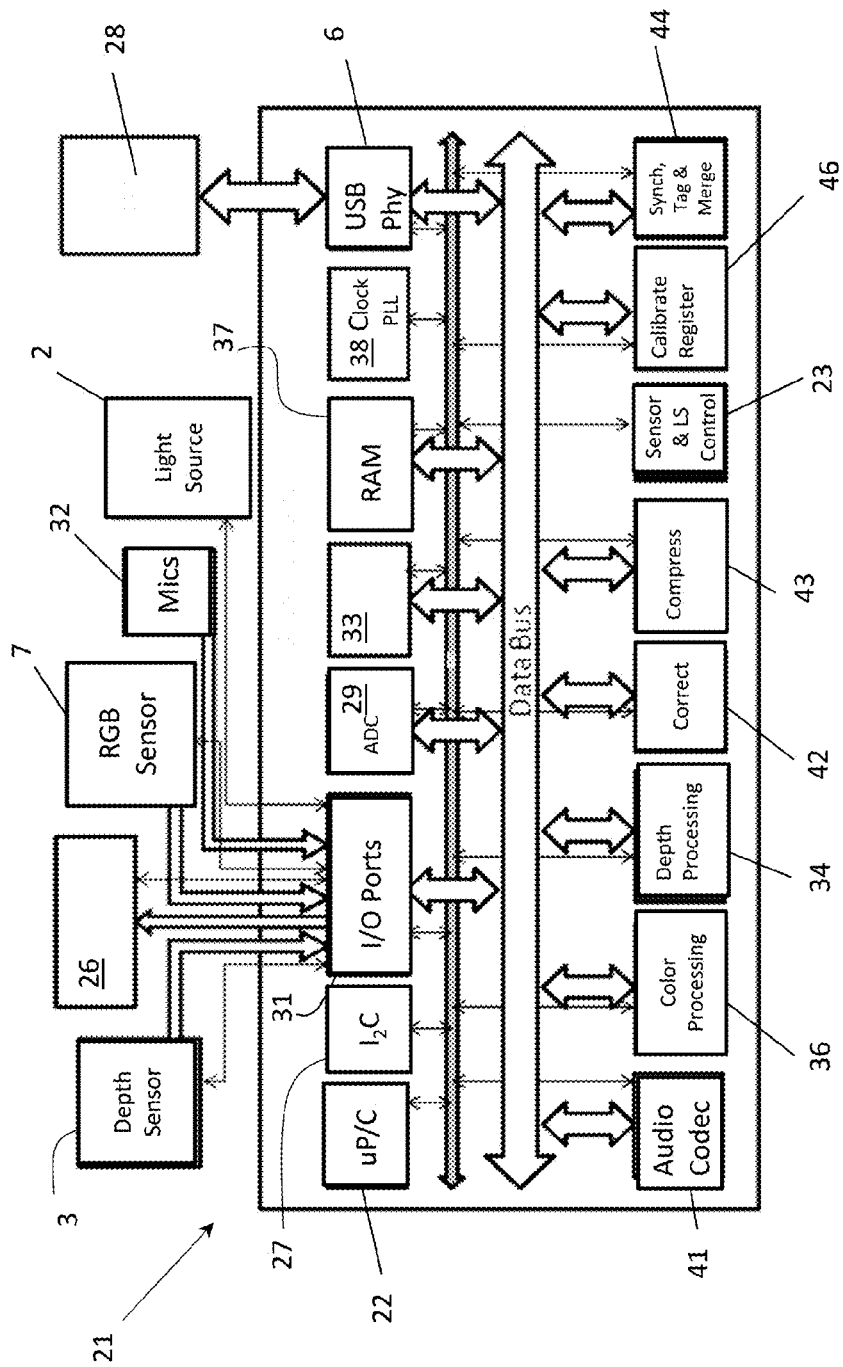
FIG. 4 is a schematic representation of and an ASIC of the depth camera of the present invention.

With reference to FIG. 4, in the present invention, the above coprocessor 21 and the following 3D imaging related functions could be implemented in gate level logic and integrated into a single application specific integrated circuit ASIC 21 or implemented in host side software or hardware or any combination in between. In a conventional time of flight based 3D input device, phase data coming from a depth sensor, raw RGB data coming from a traditional color sensor, and audio coming from a microphone or microphone array must be further processed prior to presentation to various host devices, such as PCs, TVs, mobile devices, etc. for display.

Conventional discrete component implementations require analog to digital converters (ADC) for each of the sensors and microphones, an image correction logic, compression logic and compression memory. Most of these resources can be shared when consolidated into the ASIC 21 resulting in a significant size and cost savings. Similarly, pure logic devices are typically fabricated on smaller fabrication process geometries resulting in additional size and cost reductions when the RGB ISP, RGB & Z corrections and control functions are moved off sensor into the ASIC 21.

Depending on the RGB and Depth sensor formats, the raw data streams can exceed the bandwidth of the host input port, typically USB 2.0 and must therefore be processed and or compressed prior to transport.

The below described functions of the ASIC 21 can be performed faster when implemented in hardware logic as opposed to software running on a host's processor. If the host's processor is required to perform the below mentioned ASIC functions as well as application processing the result can be increased application latency, which can be distracting to a user. Similarly, keeping data flow on chip during processing can increase processing speed and further decrease application latency.

An embedded microprocessor/controller 22 controls the flow of data and command instructions within the ASIC 21, and turns on or off specific ASIC logic block level functions or functions within ASIC logic blocks. The microprocessor 22 also controls data and command instruction flow of sensors, i.e. the depth sensor 3 and RGB sensor 7, and the light source 2, in particular from the sensor and light source control module 23. The microprocessor 22 also supports device level user interfacing, e.g. buttons, switches, display 26, etc., and supports firmware based processing functions and programmability, e.g. exposure control, gain control, light source frequency and duty cycle control, depth sensor 3 to RGB 7 and light source 2 synchronization, etc.

I2C 27 is a command/instruction bus allowing command and response flow within the ASIC 21. I2C 27 is the command, control and feedback mechanism; however, other standard communication, control and feedback standards or proprietary methods could be used. Any 3D processor block could be integrated into a single chip or parts in any combination of discrete chips. The system power supply (not shown) could be a standalone power supply, integrated into the 3D processor or received from a host 28 via an integrated power and data bus such as USB, Firewire, etc.

Analog to digital converter (ADC) 29 converts analog data to digital data for further on chip and host processing.

One or more Input/Output Port(s) 31 supports the input of raw or preprocessed data from the RGB sensor 7, the depth sensor 3, an optional microphone 32, the light source 2 or other data; as well as command, clock or other general purpose input to the ASIC 21 from its peripherals and from the ASIC 21 to its peripherals. The input/output port 31 also provides processed data output to the display 26.

Flash Memory 33 stores or buffers data from the various input devices, e.g. depth and RGB sensors 3 and 7, for the various on chip processing modules, e.g. depth processing module 34 and color processing module 36.

RAM 37 stores command and control instruction firmware for execution by the microprocessor/controller 22.

A Clock/PLL 38 provides an internal or externally synchronized clock reference for chip function timing and control.

The USB Phy 6, which could be PCI, MIPI or any other standard or proprietary Phy provides a physical interface from the ASIC 21 to the host device 28.

An Audio Codec 41 converts raw or preprocessed audio data from mics 32 to an industry standard or proprietary data format for use by the host 28.

The Color Processing module 36 performs white balancing/color correction, color demosaicing, color space conversion, and other raw or preprocessed RGB data stream related processing functions to the data from the RGB sensor 7.

The Depth Processing module 34 performs phase to depth data conversion, etc. on raw or preprocessed depth data form the depth sensor 3.

A Corrections module 42 performs lens, Gama, dark level compensation, sensor defect, scaling, horizontal/vertical flip/rotation, filtering, flicker, dealiasing, binning etc.

A Compression module 43 compresses raw or preprocess RGB, Depth, Audio or other data from the corresponding modules 7, 3, 32 to industry standard, e.g. JPEG, MJPEG, H.264, Dolby AC3, etc. or proprietary formats for use by host device 28.

A Data Bus 44 transfers data between the functional blocks, e.g. modules 3, 7, 32, memory 33, 37 and ports 31 of the ASIC 21 under direction of the microprocessor/controller 22.

Synchronization, Tagging & Merging module 44 tags, synchronizes and multiplexes packetized RGB, Depth and Audio raw or processed data streams from the corresponding sensors 7, 3 and 32 for transfer and presentation to the host 28 via the USB Phy 6.

Calibration and Registration module 46 uses algorithms and internal coefficients created from camera measurements made during the calibration phase of camera testing to correlate camera depth values with actual object distance values. Registration is the process of correlating the x & y locations of pixels between the RGB and Depth sensors.

The microprocessor 22 first applies settings for one of the predetermined frequency, power and integration period triplet stored in the RAM 37 or other suitable non-transitory memory. Preferably, the microprocessor 22 then assesses the image quality, such as depth accuracy, and image sharpness, e.g. by determining at least one of: the number of blurred pixels, the number of saturated pixels, and the number of dark pixels, etc., within the field of view and volume of interest sub-range, and comparing the determined number to a predetermined threshold value, based on algorithms stored in non-volatile memory or hard coded in the processor or other chip. The micro-processor 22 then, using other algorithms stored in memory or hard coded in the processor or other chip, calculates appropriate new triplets and triplet sequences for best or improved dynamic range. The micro-processor 22 then adjusts the clock timing (frequency), light source 2 power level, lens 9 zoom and focus settings corresponding to each sequential triplet, as necessary. Image quality based feedback loops may or may not be used to validate or monitor sensor 3, lens 9 or light source 2 actual settings or performance. The resulting triplets could be sequenced in any order and the system could be implemented with a fixed focus lens with appropriate depth of field for the field of view and volume of interest. The micro-processor 22 then merges the data from each triplet into or calculates a composite frame(s) for transfer to the host device 28.

Such processing and control could also be implemented on and performed by the sensor 3 or the raw data could be transferred to the host 28 for processing or in any distributed processing device combination. Similarly, such processing could be performed before, after or during phase to depth calculation. i.e. on phase, depth/range or intermediate data; and before, after or during other (calibration, registration, corrections, compression and audio, RGB & Depth data synchronization, tagging and merging, etc.) data processing activities.

We claim:

1. A depth camera for a time of flight device for presenting three dimensional data to a host comprising:
    a light source for launching a beam of light at a range of interest for a field of view, the light source having an adjustable frequency and an adjustable peak optical power;
    a detector array for receiving and detecting portions of the beam of light reflected off of objects within the range of interest and field of view; and
    a controller for adjusting the light source frequency and peak optical power within a single frame time period in accordance with a plurality of frequency and peak optical power pairs to obtain a plurality of three dimensional data measurements for each frame time period, whereby the range of interest and field of view is divided into a plurality of volumes of interest, each volume of interest having a different, frequency, peak optical power, and minimum and maximum distance from the light source, to increase dynamic range and depth of field within each volume of interest.

2. The depth camera according to claim 1, wherein initial light source frequency and peak optical power settings for each volume of interest are predetermined and stored in non-volatile memory accessible by the controller.

3. The depth camera according to claim 2, wherein the controller adjusts at least one of the light source frequency and the peak optical power based on feedback from the detector array.

4. The depth camera according to claim 1, wherein the controller also adjusts a light source integration period in accordance with predetermined or calculated integration periods for each frequency and peak optical power pair.

5. The depth camera according to claim 4, further comprising a lens for focusing the beam of light; wherein the controller is also capable of adjusting a focus of the lens along with each frequency, peak optical power and integration period.

6. The depth camera according to claim 5, further comprising an adjustable aperture for the lens; wherein the controller is also capable of adjusting the adjustable aperture along with each frequency, peak optical power, integration period and lens focus.

7. The depth camera according to claim 1, further comprising an adjustable lens for focusing the beam of light; wherein the controller is also capable of adjusting a focus of the lens along with each frequency and peak optical power.

8. The depth camera according to claim 1, further comprising a lens and an adjustable aperture for the lens; wherein the controller is also capable of adjusting the adjustable aperture along with each frequency and peak optical power pair.

9. The depth camera according to claim 1, wherein the controller is also capable of aggregating the plurality of three dimensional data measurements.

10. The depth camera according to claim 9, further comprising an ASIC incorporating the controller and other control and processing functions of the camera to minimize latency between the depth camera and the host.

11. The depth camera according to claim 1, wherein the controller is also capable of dynamically adjusting any one or more of the frequencies, and the peak optical powers depending on a reflectivity of an object.

12. The depth camera according to claim 1, wherein a first frequency is between 10 and 40 MHz, and a first peak optical power is greater than 1 W.

13. The depth camera according to claim 1, wherein a second frequency is between 40 and 50 MHz, and a second peak optical power is between 250 mW and 1 W.

14. The depth camera according to claim 1, wherein a third frequency is greater than 75 MHz, and a third peak optical power is less than 250 mW.

15. A method of operating a depth camera comprising:
    a) launching light from a light source at a range of interest over a field of view; and
    b) receiving and detecting portions of the light reflected off of various objects within the range of interest and the field of view;
    wherein step a) includes:
    launching a first beam of light at a first frequency and a first peak optical power for a first integration period within a single frame time period to increase depth of field and dynamic range within a first volume of interest to generate a first three dimensional data measurement, launching a second beam of light at a second frequency greater than the first frequency and a second peak optical power less than the first peak optical power for a second integration period within the same single frame time period to increase depth of field and dynamic range within a second volume of interest to generate a second three dimensional data measurement; and launching a third beam of light at a third frequency greater than the second frequency and a third peak optical power less than the second peak optical power for a third integration period within the same single frame time period to increase depth of field and dynamic range within a third volume of interest to generate a third three dimensional data measurement.

16. The method according to claim 15, wherein step b) including aggregating the first, second and third three dimensional data measurements.

17. The method according to claim 15, further comprising adjusting a focus of a lens associated with the light source for each of the first, second and third volumes of interest.

18. The method according to claim 15, further comprising adjusting an aperture of a lens associated with the light source for each of the first, second and third volumes of interest.

19. The method according to claim 15, further comprising dynamically adjusting any one or more of the first, second and third frequencies, and the first, second and third peak optical powers depending on a reflectivity of one of the objects.

20. The method according to claim 15, wherein the first, second and third integration periods are different.

21. The method according to claim 15, wherein the first frequency is between 20 and 25 MHz, and the first peak optical power is greater than 500 mW.

22. The method according to claim 15, wherein the second frequency is between 40 and 50 MHz, and the second peak optical power is between 250 and 500 mW.

23. The method according to claim 15, wherein the third frequency is greater than 60 MHz, and the third peak optical power is less than 250 mW.

24. A time of flight based depth camera for presenting three dimensional data to a host device comprising:
   a light source for launching a beam of light at a range of interest for a field of view, the light source having variable integration time periods and peak optical power;
   a detector array for receiving and detecting portions of the beam of light reflected off of objects within the range of interest and field of view; and
   a controller for adjusting the light source integration time period and peak optical power within a single frame time period in accordance with a plurality of integration time period and peak optical power pairs to obtain a plurality of three dimensional data measurements,
   whereby the range of interest and field of view is divided into a plurality of volumes of interest, each volume of interest having a different, integration time period, peak optical power, and minimum and maximum distance from the light source, to increase dynamic range and depth of field within each volume of interest.

* * * * *

UNITED STATES PATENT AND TRADEMARK OFFICE
CERTIFICATE OF CORRECTION

| | | |
|---|---|---|
| PATENT NO. | : 9,294,754 B2 | Page 1 of 1 |
| APPLICATION NO. | : 13/757301 | |
| DATED | : March 22, 2016 | |
| INVENTOR(S) | : Bryed Billerbeck et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this
Fourteenth Day of June, 2016

Michelle K. Lee
*Director of the United States Patent and Trademark Office*